US009708864B2

(12) United States Patent
Tan et al.

(10) Patent No.: US 9,708,864 B2
(45) Date of Patent: Jul. 18, 2017

(54) RISER ASSEMBLY AND METHOD OF FORMING A RISER ASSEMBLY

(71) Applicant: GE Oil & Gas UK Limited, Nailsea, Bristol (GB)

(72) Inventors: Zhimin Tan, Katy, TX (US); Yucheng Hou, Katy, TX (US); Yuan Tian, Houston, TX (US); Yanqiu Zhang, Houston, TX (US); Fabio de Souza Pires, Rio de Janeiro (BR); George Karabelas, Houghton le Spring (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 0 days.

(21) Appl. No.: 14/579,930

(22) Filed: Dec. 22, 2014

(65) Prior Publication Data

US 2016/0177633 A1 Jun. 23, 2016

(51) Int. Cl.
*E21B 17/01* (2006.01)
*F16L 1/24* (2006.01)
*F16L 1/15* (2006.01)

(52) U.S. Cl.
CPC .......... *E21B 17/012* (2013.01); *E21B 17/015* (2013.01); *F16L 1/24* (2013.01); *F16L 1/15* (2013.01)

(58) Field of Classification Search
CPC ...... E21B 17/01; E21B 17/012; E21B 17/015; E21B 17/017; E21B 19/004; F16L 11/133; F16L 1/24

(Continued)

(56) References Cited

U.S. PATENT DOCUMENTS 3,295,489 A * 1/1967 Bossa ............... B63B 22/18
114/230.2
4,176,986 A * 12/1979 Taft ............... E21B 17/012
166/350

(Continued)

FOREIGN PATENT DOCUMENTS

NL EP 2886787 A1 * 6/2015 ........... E21B 17/012
WO WO2007/125276 A1 11/2007

(Continued)

OTHER PUBLICATIONS

International Search Report and Written Opinion of the International Searching Authority, mailed Feb. 11, 2016, for corresponding International Application No. PCT/GB2015/053168, 12 pages.

*Primary Examiner* — James G Sayre
(74) *Attorney, Agent, or Firm* — Klarquist Sparkman, LLP

(57) ABSTRACT

A riser assembly for transporting fluids from a sub-sea location is disclosed. The riser assembly includes a riser having at least one segment of flexible pipe and a plurality of buoyancy compensating elements connected to the riser and connected together in an in-line configuration to form a mid-line buoyancy section. The riser assembly also includes at least one buoyancy aid connected to the riser at a position above and spaced apart from the mid-line buoyancy section. The at least one buoyancy aid forms a first distributed buoyancy section and is sufficiently buoyant to maintain a tension load on the riser between the first distributed buoyancy section and the mid-line line buoyancy section. The riser assembly further includes at least one further buoyancy compensating element connected to the riser at a position above and spaced apart from the first distributed buoyancy section to form a second distributed buoyancy section. The (Continued)

second distributed buoyancy section is configured to support a portion of the riser in a wave configuration.

17 Claims, 7 Drawing Sheets

(58) Field of Classification Search
USPC .......... 405/224.2, 224.3, 350, 367; 166/350, 166/367, 224.2, 224.3
See application file for complete search history.

(56) References Cited

U.S. PATENT DOCUMENTS

| | | | | |
|---|---|---|---|---|
| 7,287,936 | B2* | 10/2007 | Streiff | E21B 17/015 166/350 |
| 8,696,247 | B2* | 4/2014 | Mungall | E21B 17/012 405/224.4 |
| 2006/0056918 | A1* | 3/2006 | Luppi | B63B 21/508 405/169 |
| 2011/0290499 | A1* | 12/2011 | Petegem | B63B 25/28 166/350 |
| 2012/0160510 | A1* | 6/2012 | Bhat | B63B 27/24 166/367 |
| 2012/0292040 | A1* | 11/2012 | Prescott | E21B 17/01 166/345 |

FOREIGN PATENT DOCUMENTS

| | | |
|---|---|---|
| WO | WO2012/172305 A2 | 12/2012 |
| WO | WO2013/079915 A2 | 6/2013 |

* cited by examiner

RISER ASSEMBLY AND METHOD OF FORMING A RISER ASSEMBLY

FIELD

The present invention relates to a riser assembly and method of forming a riser assembly. In particular, but not exclusively, the present invention relates to riser assembly and method of forming a riser assembly using a plurality of buoyancy compensating elements. The buoyancy compensating elements are provided along the riser in an arrangement to help provide bending support where needed and maintain the riser in a suitable configuration in a sub-sea environment.

BACKGROUND

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 meters (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time. That is, in deep and ultra-deep water environments, the weight of the pipe itself causes a high tension loading on the pipe, which will be greatest at the hang off region (where the pipe attaches to a vessel or floating facility).

FIG. 4 illustrates a riser assembly 400 suitable for transporting production fluid such as oil and/or gas and/or water from a sub-sea location 401 to a floating facility. For example, in FIG. 4 the sub-sea location 401 includes a sub-sea flow line. The flexible flow line 405 comprises a flexible pipe, wholly or in part, resting on the sea floor 404 or buried below the sea floor and used in a static application. The floating facility may be provided by a platform and/or buoy or, as illustrated in FIG. 4, a ship 402. The riser assembly 400 is provided as a flexible riser, that is to say a flexible pipe 403 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 4 also illustrates how portions of flexible pipe can be utilised as a flow line 405 or jumper 406.

One technique which has been attempted in the past to in some way alleviate the above-mentioned problem is the addition of buoyancy aids at predetermined locations along the length of a riser. The buoyancy aids provide an upwards lift to counteract the weight of the riser, effectively taking a portion of the weight of the riser, at various points along its length. Employment of buoyancy aids involves a relatively lower installation cost compared to some other configurations, such as a mid-water arch structure, and also allows a relatively faster installation time.

An example of a known riser configuration using buoyancy aids to support the riser is a stepped riser configuration 100, such as disclosed in WO2007/125276 and shown in FIG. 1, in which buoyancy aids 101 are provided at discrete locations along a flexible pipe 103. The riser is suitable for transporting production fluid such as oil and/or gas and/or water from a subsea location to a floating facility 105 such as a platform or buoy or ship. In some cases this assembly may restrict the amount of vessel excursion permitted.

Other riser configurations may require the addition of ballast weight to a flexible pipe to decrease the buoyancy of the pipe at one or more positions to suit a particular marine environment or production fluid extraction set up.

As used herein, the term "buoyancy compensating element" is used to encompass both buoyancy aids for increasing buoyancy and ballast weights for decreasing buoyancy. The term "buoyancy aid" is used to encompass elements for increasing buoyancy and the term "ballast weight" is used to encompass elements for decreasing buoyancy.

As used herein, when discussing a portion of riser that is "below" or "lower than" another portion, the portion "below" or "lower" is further along the riser in the direction of the seabed. Similarly, when discussing a portion of the riser that is "above" or "higher than" another portion, the portion "above" or "higher" is further along the riser in the direction of the sea surface.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the layers of the flexible pipe body is increased.

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting.

FIGS. 2a and 2b illustrate a portion of a known riser configuration suitable for deep and ultra-deep water. As shown in FIG. 2a, a plurality of buoyancy modules 201 are connected to the riser 200 in an in-line configuration. This is known in the art as a mid-line buoyancy system. The buoyancy modules 201 help to control hang off tension level in the riser. However, in use the riser is subjected to dynamic loading due to vessel motion or tidal effects, for example, which can cause curvature changes in the riser configuration. Overbending can also occur when the flexible pipe is installed. It is generally advantageous to prevent overbending and control such changes within predetermined limits. In this example, the riser between the mid-line buoyancy system and the vessel hang off may be subject to slack and subsequent compression and bending at the top of the mid-line buoyancy system as shown in circle A.

For deep water, the vessel offset (the degree of vertical movement of the vessel) may be as large as 10-12% of the water depth. As such, for ultra-deep water (for example 2200 m), the vessel offset may be up to 264 m. This degree of movement can cause significant bending and compression of the riser, which can lead to riser fatigue.

Previously, when providing be compensating elements in an in-line configuration, as disclosed in WO2013/079915, the top first buoyancy module 202 has been designed with a bellmouth profile 204 (as shown in FIG. 2b), to help control the bending of the pipe as it exits the mid-line buoyancy system, to prevent the riser from compression and overbending. However, the bellmouth profile 204 may not be suitable for all applications. Furthermore, the profiled buoyancy module 202 requires additional design and manufacture effort.

It would be useful to provide a riser assembly that is suitable for deep and ultra-deep water environments that overcomes or ameliorates the various issues mentioned above.

SUMMARY

According to a first aspect of the present invention there is provided a riser assembly for transporting fluids from a sub-sea location, comprising:
 a riser comprising at least one segment of flexible pipe;
 a plurality of buoyancy compensating elements connected to the riser and connected together in an in-line configuration to form a mid-line buoyancy section;
 at least one buoyancy aid connected to the riser at a position above and spaced apart from the mid-line buoyancy section, the at least one buoyancy aid forming a first distributed buoyancy section and being sufficiently buoyant to maintain a tension load on the riser between the first distributed buoyancy section and the mid-line line buoyancy section; and
 at least one further buoyancy compensating element connected to the riser at a position above and spaced apart from the first distributed buoyancy section to form a second distributed buoyancy section, the second distributed buoyancy section configured to support a portion of the riser in a wave configuration.

According to a second aspect of the present invention there is provided a method of forming a riser assembly for transporting fluids from a sub-sea location, the method comprising:
 providing a riser comprising at least one segment of flexible pipe;
 connecting a plurality of buoyancy compensating elements the riser and connecting the buoyancy compensating elements together in an in-line configuration to form a mid-line buoyancy section;
 connecting at least one buoyancy aid to the riser at a position above and spaced apart from the mid-line buoyancy section, the at least one buoyancy aid forming a first distributed buoyancy section and being sufficiently buoyant to maintain a tension load on the riser between the first distributed buoyancy section and the mid-line line buoyancy section; and
 connecting at least one further buoyancy compensating element to the riser at a position above and spaced apart from the first distributed buoyancy section to form a second distributed buoyancy section, the second distributed buoyancy section configured to support a portion of the riser in a wave configuration.

Certain embodiments of the invention provide the advantage that a riser assembly and method of forming a riser assembly is provided that is suitable for deep water and ultra-deep water environments. Certain embodiments improve the riser performance in extreme conditions and/or reduce riser fatigue compared to other configurations.

Certain embodiments of the invention provide the advantage that a riser assembly is supported in use in a suitable configuration while minimizing risk of over bending.

Certain embodiments of the invention provide the advantage that a riser assembly can be provided that is relatively easy to assemble and relatively cost effective to provide.

BRIEF DESCRIPTION OF THE DRAWINGS

Embodiments of the invention are further described hereinafter with reference to the accompanying drawings, in which.

In the drawings like reference numerals refer to like parts.

DETAILED DESCRIPTION

Figure 2B:
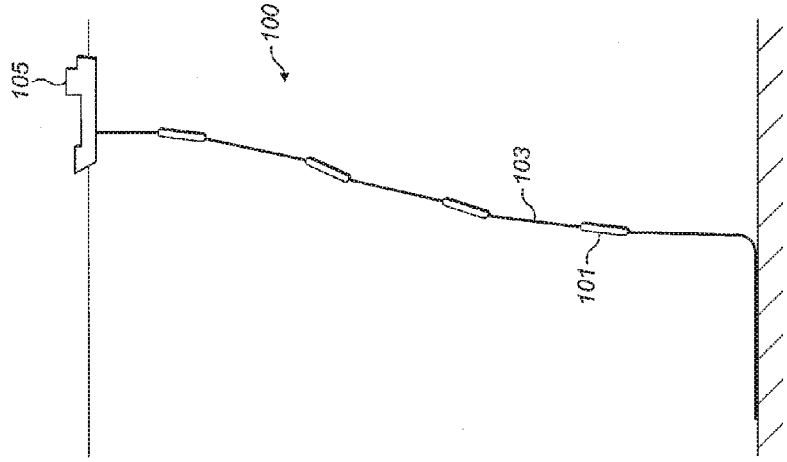
FIG. 2B is an enlarged view of a section of FIG. 2A.
Figure 2A:
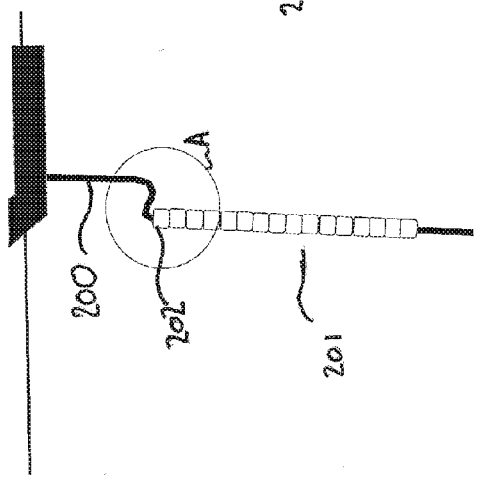
FIG. 2A illustrates another known riser configuration.
Figure 1:
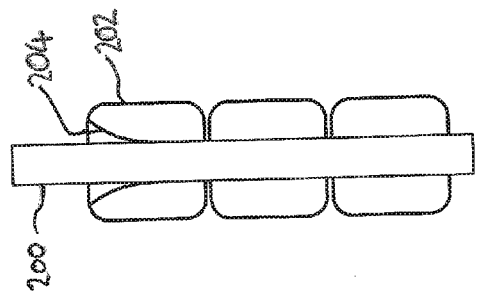
FIG. 1 illustrates a known riser configuration.
Figure 3:
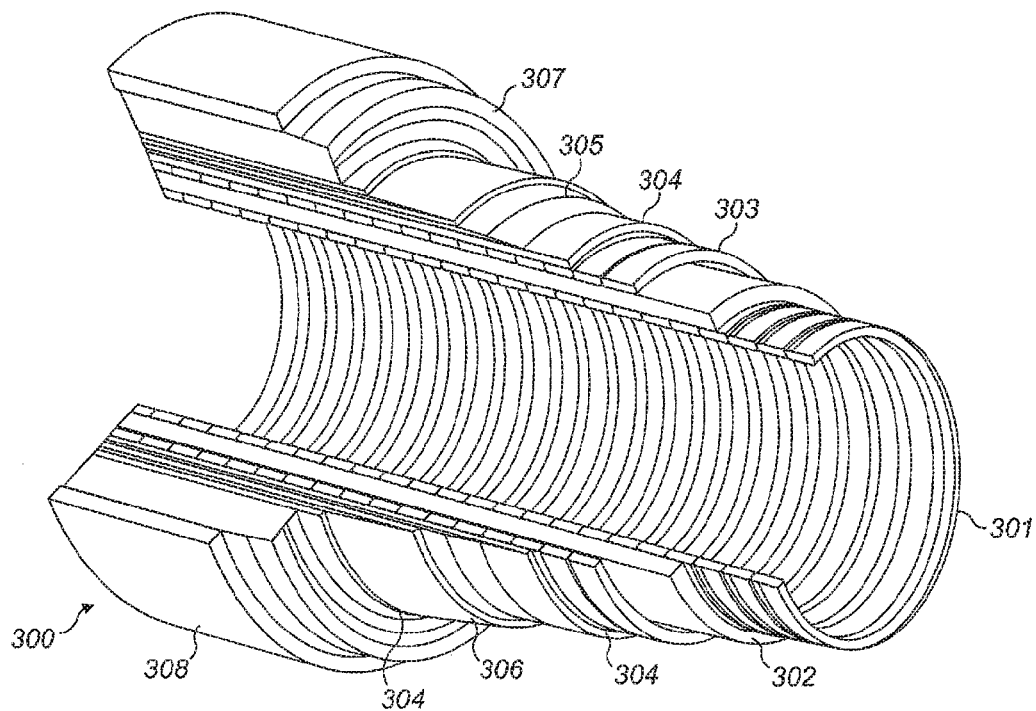
FIG. 3 illustrates a flexible pipe body.
Figure 4:
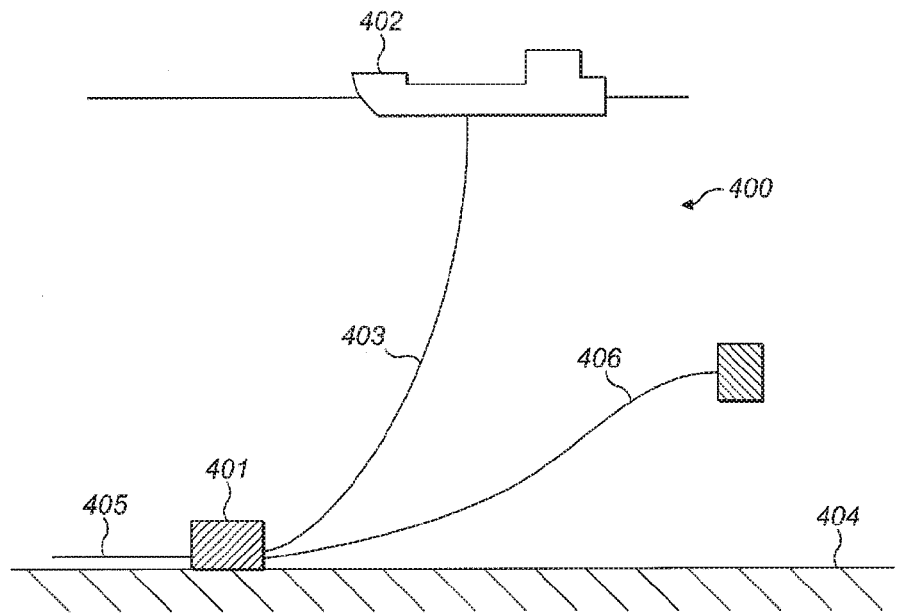
FIG. 4 illustrates a riser configuration.

Throughout this description, reference will be made to a flexible pipe. It will be understood that a flexible pipe is an assembly of a portion of pipe body and one or more end fittings in each of which a respective end of the pipe body is terminated. FIG. 3 illustrates how pipe body 300 is formed in accordance with an embodiment of the present invention from a combination of layered materials that form a pressure-containing conduit. Although a number of particular layers are illustrated in FIG. 3, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 3, a pipe body includes an optional innermost carcass layer 301. The carcass provides an interlocked construction that can be used as the innermost layer to prevent, totally or partially, collapse of an internal pressure sheath 302 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass layer) as well as such 'rough bore' applications (with a carcass layer).

The internal pressure sheath 302 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 303 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 305 and optional second tensile armour layer 306. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 304 which help contain underlying layers and to some extent prevent abrasion between adjacent layers. The tape layer may be a polymer or composite or a combination of materials.

The flexible pipe body also typically includes optional layers of insulation 307 and an outer sheath 308, which comprises a polymer layer used to protect the pipe against penetration of seawater and other external environments, corrosion, abrasion and mechanical damage.

Each flexible pipe comprises at least one portion, sometimes referred to as a segment or section of pipe body 300 together with an end fitting located at at least one end of the flexible pipe. An end fitting provides a mechanical device which forms the transition between the flexible pipe body and a connector. The different pipe layers as shown, for example, in FIG. 3 are terminated in the end fitting in such a way as to transfer the load between the flexible pipe and the connector.

Figure 5:
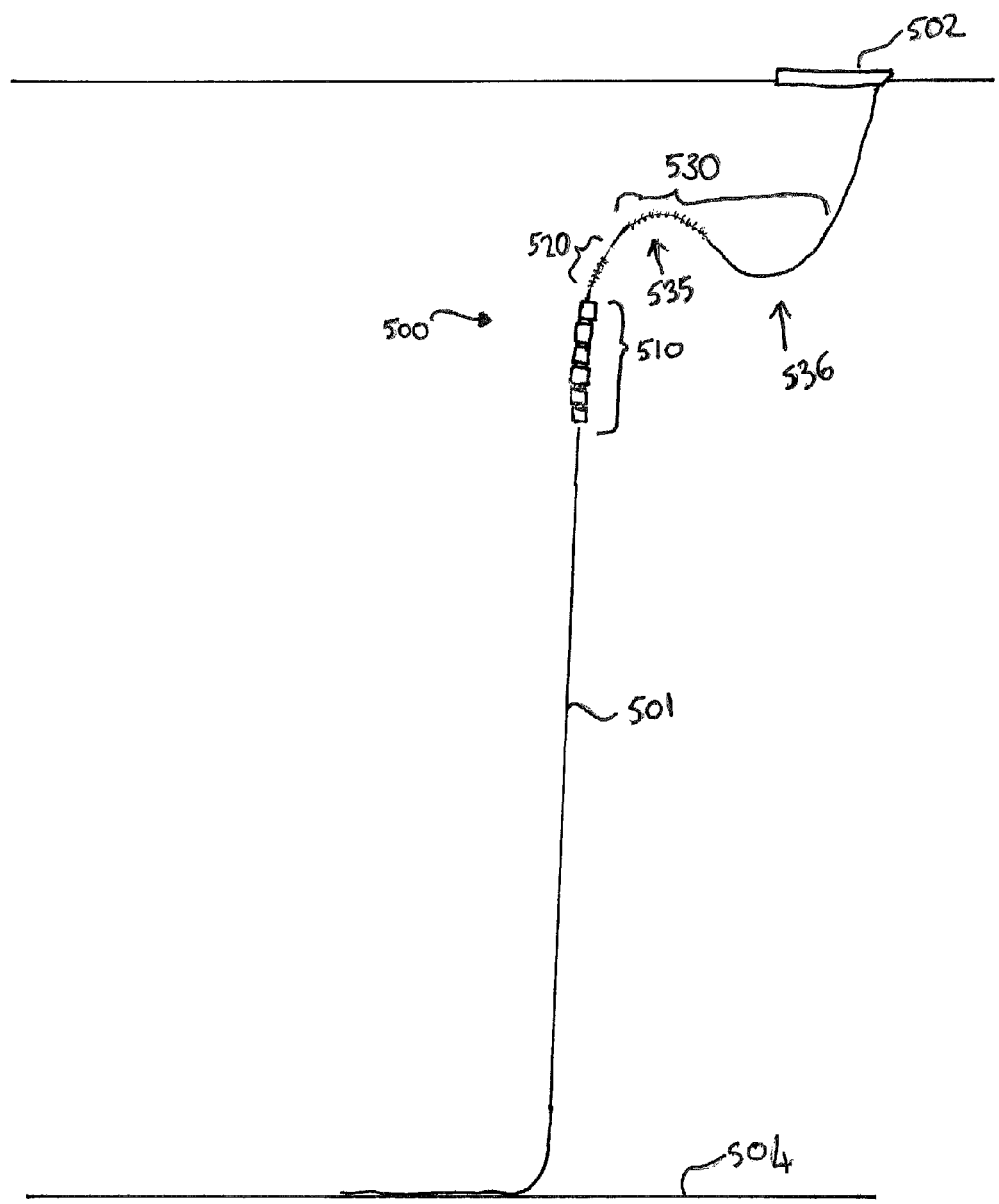
FIG. 5 illustrates a riser assembly.

FIG. 5 illustrates an embodiment of a riser assembly 500 suitable for use in deep and ultra-deep sea environments. The riser 501 extends from a floating facility, in this example a vessel 502, to the sea bed 504.

Figure 6:
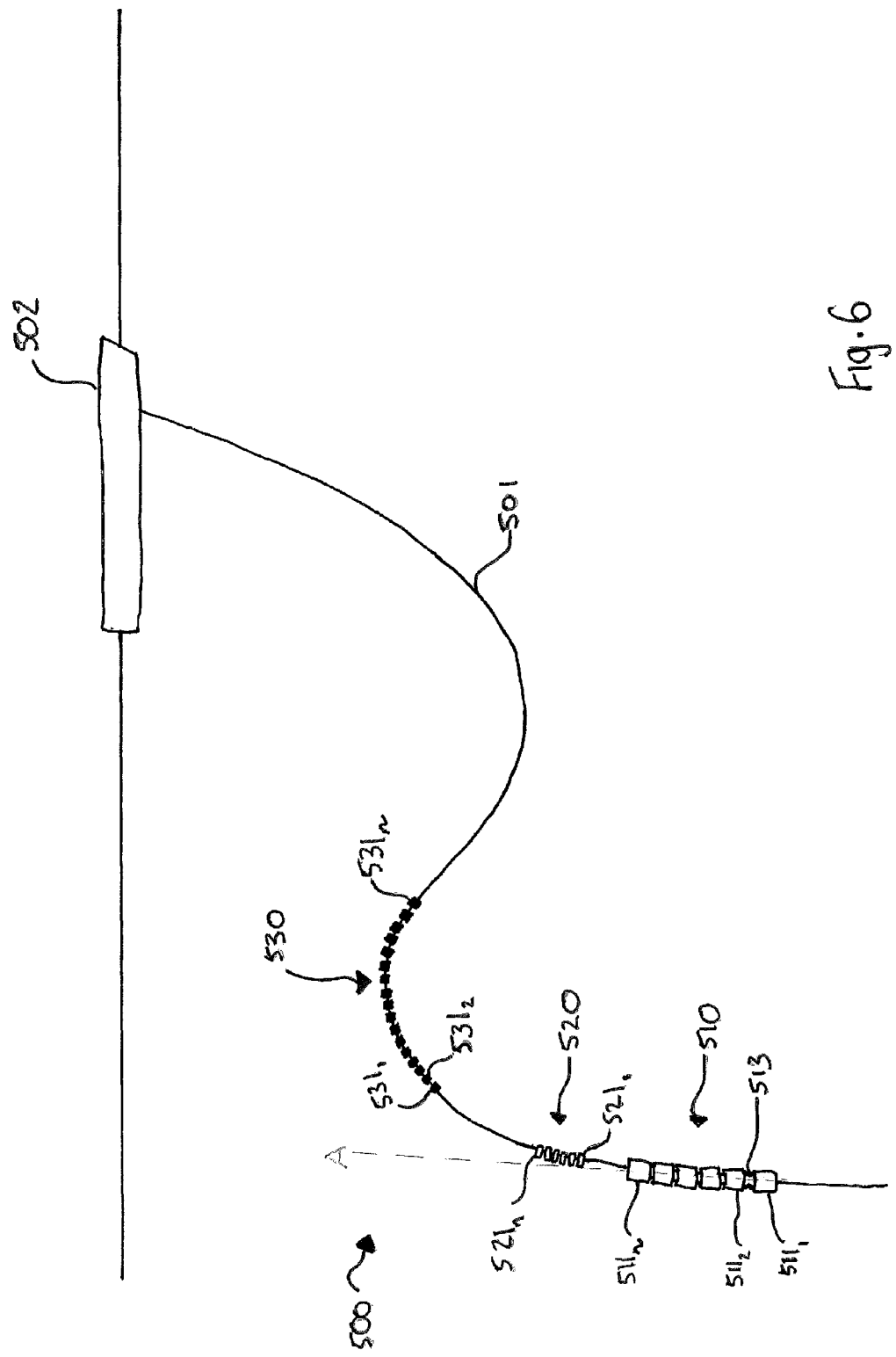
FIG. 6 illustrates an enlarged view of the riser assembly of FIG. 5

The riser assembly 500 is formed from at least one segment of flexible pipe and is supported by buoyancy compensating elements attached to the riser 501 at specific locations. The riser assembly 500 includes a mid-line buoyancy section 510, a first distributed buoyancy section 520 and a second distributed buoyancy section 530. FIG. 6 illustrates each the buoyancy sections in more detail.

In the embodiment of FIGS. 5 and 6, the mid-line buoyancy section 510 is connected to the riser at a location nearest to the seabed, the second distributed buoyancy section 530 is connected to the riser nearest to the vessel and the first distributed buoyancy section 520 is connected to the riser at some point between the mid-line buoyancy section 510 and the second distributed buoyancy section 530.

The mid-line buoyancy section 510 includes at least one buoyancy compensating element 511 connected to the riser 501 in an in-line configuration, i.e. each buoyancy compensating element 511 is connected in sequence to a next buoyancy compensating element, as described in WO2013/079915. The mid-line buoyancy section includes a plurality of buoyancy compensating elements $511_{1-n}$. The buoyancy compensating elements in this example are positively buoyant, i.e. buoyancy aids.

A first buoyancy compensating element $511_1$, positioned closest to the sea bed 504, is connected to a lowermost section of a mid-line connector 513. Here, the mid-line connector is a pair of end fittings joined in a back to back configuration. The second buoyancy compensating element $511_2$ is connected to an uppermost section of the mid-line connector 513. The remaining buoyancy compensating elements 511 are attached to each other and to the second buoyancy compensating element $511_2$ via connectors (flanges) between each of the buoyancy compensating elements 511.

The first buoyancy compensating element $511_1$ is secured to the riser via the mid-line connector 513, and further buoyancy compensating elements are secured in sequence to the first buoyancy compensating element or the mid-line connector. As such, any forces from the later-added buoyancy compensating elements are transmitted through earlier-added buoyancy compensating elements to the mid-line connection. This helps prevent excessive compression loads on the flexible pipe from the buoyancy compensating elements. In addition, since the first added buoyancy compensating element is attached to the mid-line connection, it will not slide down the flexible pipe to an unwanted position.

The first distributed buoyancy section 520 includes at least one buoyancy aid (buoyancy element) 521 connected to the riser 501, in this case clamped directly to the riser 501. The at least one buoyancy aid 521 is connected to the riser 501 at a position above the mid-line buoyancy section 510. That is, the at least one buoyancy aid 521 is connected to the riser at a position further along the riser than the mid-line buoyancy section 510 in the direction of the vessel 502 (or water surface).

In this example, the first distributed buoyancy section 520 includes a plurality of buoyancy aids 521. Each buoyancy aid 521 is connected to the riser 501 in a co-axial configuration. Aptly, each buoyancy aid 521 is connected to the riser at a distance of approximately 2 m from an adjacent buoyancy aid 521 of the first distributed buoyancy section 520.

The net buoyancy of the first distributed buoyancy section 520 is sufficient to maintain a tension load on the riser between the distributed buoyancy section 520 and the mid-line buoyancy section 510. In other words, the first distributed buoyancy section 520 has net buoyancy that is sufficient to maintain the portion of the riser 501 between the first distributed buoyancy section 520 and the mid-line buoyancy section in a substantially vertical configuration, when in use.

The tension load on the riser between the first distributed buoyancy section 520 and the mid-line buoyancy section 510 should be enough that the pipe exits the mid-line buoyancy section 510 without significant bending (less than a 25 degree deviation from the portion of the riser comprising the mid-line buoyancy section 510), but not too much tension that the pipe suffers excessive tension loading in that section. In this example the tension load is about 1500 kN. It will be understood by those familiar in the art that the actual tension loading requirement and limits are determined from the pipe structure and mass, the separation between the midline buoyancy section 510 and the distributed buoyancy section 520, and other factors such as ocean currents. Different pipe structures, configurations and locations will necessarily therefore have differing tension loading requirements and limits which may be calculated at the time of performing pipe designs. For example, the tension load on the riser section between the first distributed buoyancy section and the mid-line buoyancy section may be between 50 kN and 3500 kN.

In this example, each of the buoyancy aids 521 contributes to the net buoyancy of the first distributed buoyancy section 520.

When the riser assembly 500 is in use, the first distributed buoyancy section 520 is aptly provided at an angle of up to 10° from the central longitudinal axis A of the mid-line buoyancy section 510. It will be appreciated that the exact angle of the first distributed buoyancy section 520 in relation to the central longitudinal axis A of the mid-line buoyancy section will vary throughout the lifetime of the riser. The angle may be dependent on a number of environmental factors including vessel motion, underwater currents and changes in the net buoyancy of the first distributed buoyancy section 520 due to marine growth, for example.

The first distributed buoyancy section 520 is provided at a position on the riser spaced apart from the mid-line buoyancy section 510. That is, an uppermost buoyancy compensating element $511_n$ of the mid-line buoyancy section 510 is spaced apart from a lowermost buoyancy compensating element $521_1$ of the first distributed buoyancy section 520. As such, a portion of riser having no buoyancy compensating elements connected thereto lies between the mid-line buoyancy section 510 and the first distributed buoyancy section 520. In this example, the length of riser between the first distributed buoyancy section 520 and the mid-line buoyancy section 510 is 40 m. Aptly, the length of riser between the first distributed buoyancy section 520 and the mid-line buoyancy section 510 is at least 20 m.

The first distributed buoyancy section 520 maintains tension load on the riser between the first distributed buoyancy section 520 and the midline buoyancy section 510. The tension load on this section of the riser helps to maintain the section of the riser exiting the mid-line buoyancy section 510 in a substantially straight and/or vertical configuration (in still water the riser may be maintained vertically in accordance with embodiments of the current invention, however in reality ocean currents may determine an angle at which the riser tends from the vertical). As such, bending of the section of riser exiting the mid-line buoyancy section 510 is limited particularly at the portion directly adjacent the uppermost buoyancy compensating element $511_n$ of the mid-line buoyancy section 510.

The second distributed buoyancy section 530 is configured to support a portion of the riser 501 in a wave configuration. That is, the second distributed buoyancy section 501 supports the riser 501 to form a hog bend 535 and corresponding sag bend 536.

The second distributed buoyancy section includes at least one further buoyancy compensating element $531_{1-n}$ connected to the riser at a position above the first distributed buoyancy section 520. That is, the at least one further buoyancy compensating element $531_{1-n}$ is connected to riser at a position further along the riser 501 than the first distributed buoyancy section 520 in the direction of the vessel 502 (or water surface).

In this example, the length of riser between an uppermost buoyancy aid $521_n$ of the first distributed buoyancy section 520 and a lowermost buoyancy compensating element $531_1$ of the second distributed buoyancy section 530 is 120 m.

In this example, the second distributed buoyancy section 530 includes a plurality of buoyancy compensating elements $531_{1-n}$. Each buoyancy compensating element 531 is connected to the riser 501 in a co-axial configuration. In this example each buoyancy aid 531 is connected to the riser at a distance of approximately 2 m from an adjacent buoyancy aid 531 of the second distributed buoyancy section 530.

The buoyancy compensating elements 531 are distributed on the riser to form a wave configuration above the first distributed buoyancy section. In this example, buoyancy aids 531 are suitably distributed to form a hog bend 535.

The wave configuration of the second distributed buoyancy section 530 acts to decouple responses of the riser section below the second distributed buoyancy section 530 from vessel motions. As such the vessel offset will not cause excess tension or compression on the riser. This configuration also allows the vessel to have an area of excursion where the vessel can move over the sea surface without causing tension loading to the flexible pipe.

The skilled person will appreciate that the distances between each of the buoyancy sections, the depth of each buoyancy section in the water, and the net buoyancy of each buoyancy section, for example, should be selected depending of various environmental factors and the specific flexible pipe configuration.

For example, for an overall sea depth of 2000 m, and a typical flexible pipe having 20 cm diameter bore, the position of an upper end of the mid-line buoyancy section 510 could be selected as between 250 m and 1800 m from an upper end of the riser. The position of an upper end of the first distributed buoyancy section 520 could then be selected as between 100 m and 1020 m from the upper end of the riser and the position of an upper end of the second distributed buoyancy 530 section would be between 50 m and 1000 m, from the upper end of the riser.

The overall net buoyancy of the mid-line buoyancy section 510 would be approximately 50% of the riser system submerged weight. The overall net buoyancy of the first distributed buoyancy section 520 would be approximately 10% of the net riser submerged weight and the overall net buoyancy of the second distributed buoyancy section 530 would be approximately 20% of the net riser submerged weight (the remaining 20% of the net riser submerged weight would act as a hang-off load onto the vessel 502). It will be understood by the skilled person that these proportions will vary significantly depending on the pipe design, configuration, the latent natural buoyancy of that design, with or without fluid in the bore, and any differences in the structure of the pipe sections at different water depths. For instance the bottom section of the riser 501 may be of a heavier construction, designed to withstand the hydrostatic pressure of water at 2000 m water depth, and therefore an increased amount of net buoyancy may be required in the mid-line buoyancy 510, and less buoyancy may then be required in distributed buoyancy sections 520 and 530 with a lighter construction of pipe in the upper section of riser.

A specific example of a riser tested in the configuration of the above embodiment (FIGS. 5 and 6) will now be described.

A flexible pipe was provided with the properties as shown in Table 1 below. The riser was deployed at a depth of 2250 m.

TABLE 1

Properties of production riser

| Item | Value |
|---|---|
| ID (mm) | 203.20 |
| OD (mm) | 393.95 |
| Nominal Bend Stiffness EI (kN * m$^2$) | 275.09 |
| Axial Stiffness (kN) | 949775 |
| Unit weight, empty in air (kg/m) | 272.49 |
| Operating Radius (m) | 3.86 |
| Internal Design Pressure (MPa) | 7.35 |
| External Design Pressure (MPa) | 34.47 |
| Internal Design Temperature (deg C.) | 90 |
| External Design Temperature (deg C.) | 90 |

The equivalent total buoyancy for the riser was 286 ton (approximately 260 metric tonnes).

Figure 7:
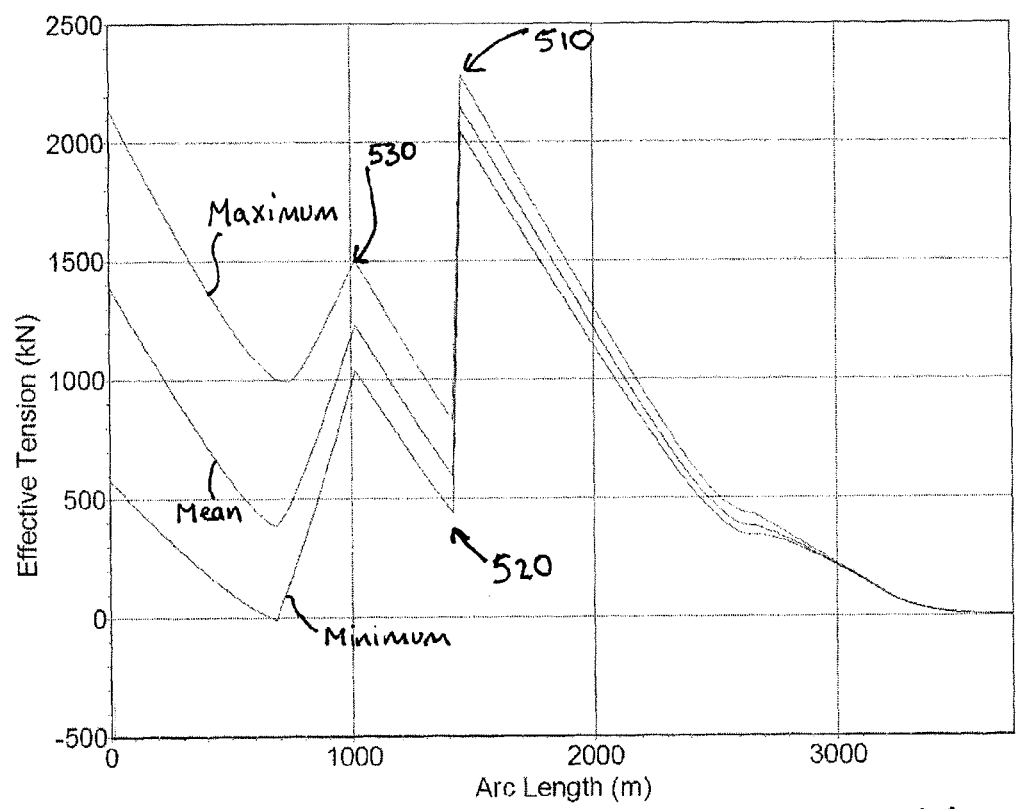
FIG. 7 is a graph that illustrates tension loads along a riser.

FIG. 7 illustrates the tension loads measured along the riser (with 0 m arc length being at the top of the riser). It can be seen that the peak tension loading (mean around 2200 kN) is at the region just below the mid-line buoyancy section 510 and with a secondary peak at the second distributed buoyancy section 530. The drop in effective tension from its peak is reduced by the tension applied by the first distributed buoyancy 520.

Other measurements were performed as follows in Table 2.

TABLE 2

| | |
|---|---|
| Max. top tension (kN) | 2145.5 |
| Max. tension along riser (kN) | 2282.8 |
| Max. compression (kN) | 0 |
| Max. curvature along riser (1/m) | 0.03 |
| Min. bending radius along riser (m) | 29 |
| Max. suspended length (m) | 2898 |

Figure 8:
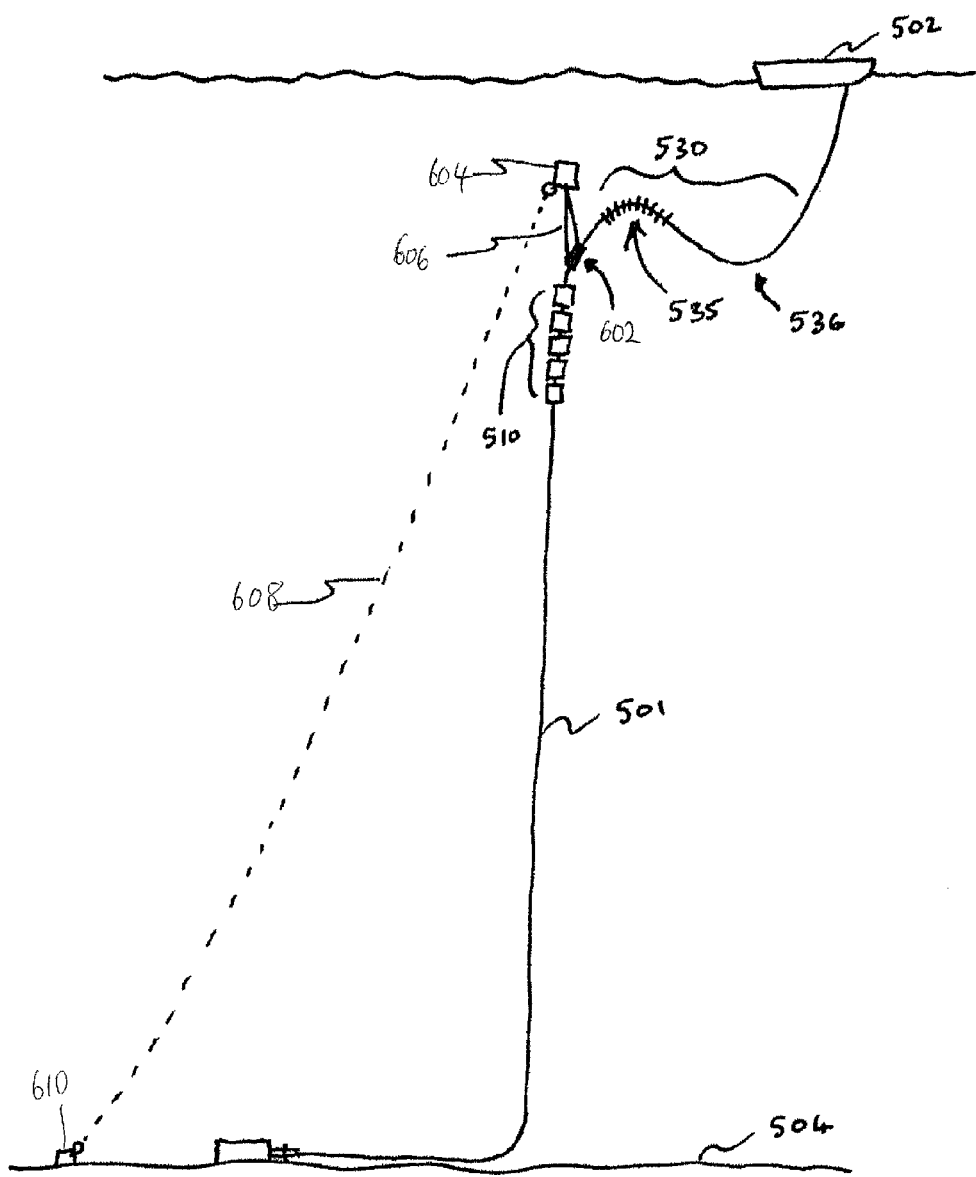
FIG. 8 illustrates another riser assembly.
Figure 9:
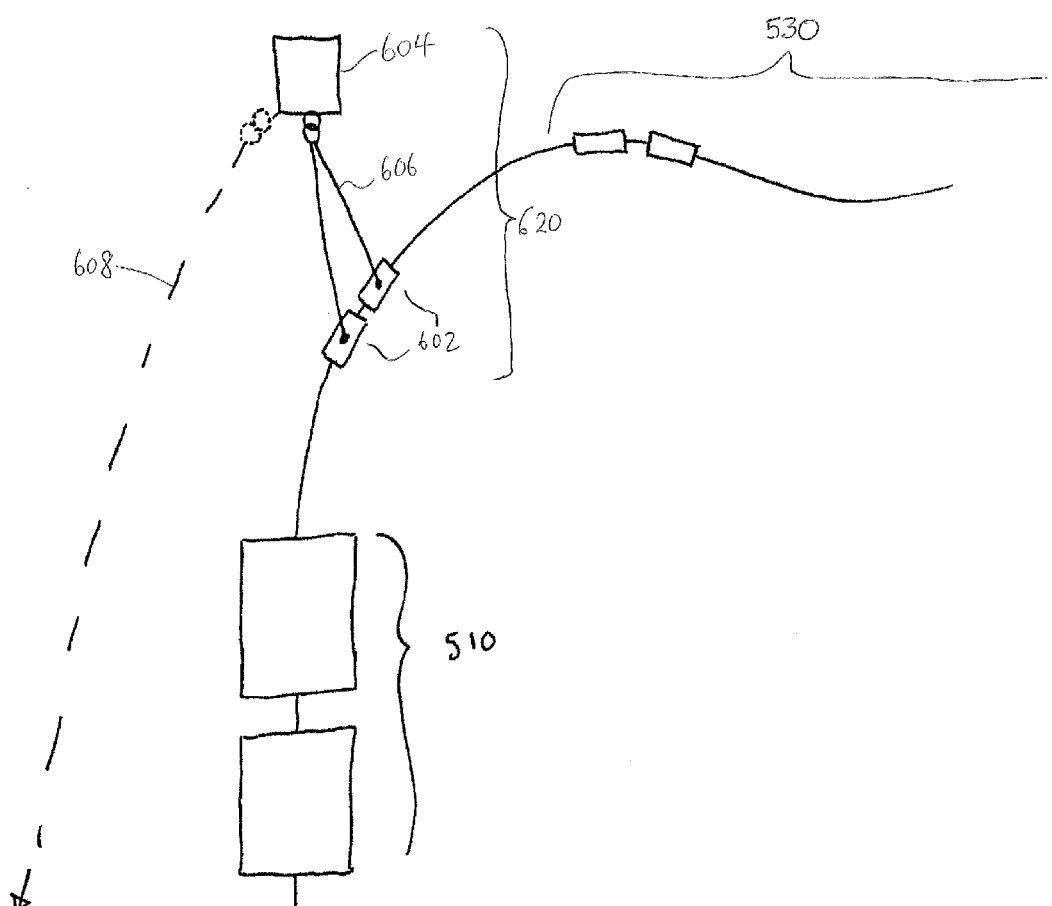
FIG. 9 illustrates an enlarged view of the riser assembly of FIG. 8.

FIGS. 8 and 9 illustrate a further embodiment. Here, many of the elements are the same as the first embodiment shown in FIGS. 5 and 6 and are given the same reference numbers. However, in this second embodiment, rather than the first distributed buoyancy section comprising buoyancy aids to maintain an appropriate tension load on the riser between the first distributed buoyancy section and the midline buoyancy section 510, the tension is provided to the riser by a first distributed buoyancy section 620 in another manner.

That is, at a location above the mid-line buoyancy section 510, there are, in this case, two clamps 602 affixed to the riser between the midline buoyancy section 510 and the second distributed buoyancy section 530. The clamps are tethered to a big buoy (buoyancy aid) 604 by tethers 606. It will be appreciated that instead of clamps, the tethers 606 may be attached to the riser by other means, e.g. small buoys. It will be appreciated that other numbers of tethers may be used, e.g. 1, 3, or more, and the tethers may be replaced with chains or rope or other filament.

The big buoy 604 is positively buoyant and floats mid water. The big buoy 604 has a predetermined buoyancy, such that, by tethering the riser to the big buoy 604, a suitable tension load is applied to the riser to maintain a tension load on the riser between the first distributed buoyancy section 620 and the midline buoyancy section 510.

The tension load on the riser between the first distributed buoyancy section 620 and the mid-line buoyancy section 510 should be enough that the pipe exits the mid-line buoyancy section 510 without significant bending (less than a 25 degree deviation from the portion of the riser comprising the mid-line buoyancy section 510), but not too much tension that the pipe suffers excessive tension loading in that section.

Optionally, as shown in FIGS. 8 and 9, the big buoy 604 is tethered in position by a tether 608 attached at the seabed to an anchor 610. Aptly 2 or more tethers may be used to prevent the big buoy 604 from straying from its position in the water. The tether 608 helps to maintain the position of the big buoy 604.

Various modifications to the detailed arrangements as described above are possible. For example, although the mid-line buoyancy section has been described above as including positively buoyant buoyancy aids, in other examples one or more of the buoyancy compensating elements 511 may be ballast weights (negatively buoyant). This may be particularly useful where the flexible pipe forming the riser is naturally buoyant itself.

The mid-line buoyancy section 510 may optionally include two or more buoyancy compensating elements. The buoyancy compensating elements should be configured to provide sufficient support to section of riser below.

The mid-line buoyancy section 510 may include any number of buoyancy compensating elements suitable for the specific requirements of the riser. For example, the mid-line buoyancy section 510 may include between 2 and 20 buoyancy compensating elements in total. Aptly, the mid-line buoyancy section 510 may include 6 buoyancy compensating elements.

Although in the example above, the buoyancy compensating elements of the mid-line buoyancy section are described as being attached to the riser via a midline connector, it will be appreciated that any technique may be used to connect the buoyancy compensating elements to the riser. For example, the buoyancy compensating elements may be connected to the riser via clamps, chains, tethers or the buoyancy compensating elements may be integral with the riser or connected to the riser in any other suitable manner. Similarly, the buoyancy compensating elements of the first distributed buoyancy section and the second distributed buoyancy section may be connected to the riser using any suitable technique as described above.

Rather than the first distributed buoyancy section 520 including a plurality of buoyancy aids, the first distributed buoyancy section 520 may optionally include only one buoyancy aid. In this example, the one buoyancy aid has sufficient buoyancy to maintain the portion of the riser between the mid-line buoyancy section and the first distributed buoyancy section in a substantially vertical configuration. The one buoyancy aid should also have sufficient buoyancy to maintain a tension load on the portion of the riser between the mid-line buoyancy section and the first distributed buoyancy section. If a plurality of buoyancy aids are provided, the net buoyancy of all the buoyancy aids together should be sufficient to maintain a tension load on the portion of the riser between the mid-line buoyancy section and the first distributed buoyancy section.

Optionally, the first distributed buoyancy section may include buoyancy aids installed around a mid-line connection.

Depending of the design criteria of the riser assembly (e.g. the minimum bending radius) and the net buoyancy of the first distributed buoyancy section 520, the first distributed buoyancy section 520 may be provided at an angle up to 25° from the central longitudinal axis A of the mid-line buoyancy section 510. Aptly, the first distributed buoyancy section 520 may be provided at an angle up to 15° from the central longitudinal axis A of the mid-line buoyancy section 510. More aptly, the first distributed buoyancy section 520 may be provided at an angle up to 10° from the central longitudinal axis A of the mid-line buoyancy section 510. The angle with be dependent upon various environmental factors including underwater currents and marine growth affecting the magnitude of the buoyant force provided by the first distributed buoyancy section 520.

The second distributed buoyancy section 530 includes at least one buoyancy compensating element and may optionally include ballast weights and/or buoyancy aids. Ballast weights and/or buoyancy aids may be readily selected according to design requirements by a person skilled in the art and appropriately connected to the riser form a wave configuration. Ballast weights may be particularly useful in the second distributed buoyancy section for risers that are formed from naturally buoyancy flexible pipe. Ballast weights could also be particularly useful to help create a suitable sag bend in the riser and would necessarily then be positioned closer to the vessel 502 end of the riser. The position of ballast weights may also therefore be deeper than that of any buoyancy aid creating a hog bend, and as a result may be fixed at a position deeper that of the distributed buoyancy 520, for instance at a position between 100 and 800 m below the water surface.

Optionally, the first distributed buoyancy section 520 may be combined with the second distributed buoyancy section 530. That is, there may be a minimal gap between the first distributed buoyancy section and the second distributed buoyancy section. As such, the gap between the uppermost buoyancy aid of the first distributed buoyancy section and the lowermost buoyancy compensating element of the second distributed buoyancy section may be as little as 1 m or 2 m, for example.

The distance (length of riser) between each of the buoyancy sections (the mid-line buoyancy section, the first distributed buoyancy section, and the second distributed buoyancy section) may vary depending on various factors including the water depth, pipe weight, and natural buoyancy of the pipe itself etc.

The distance between the mid-line buoyancy section and the first distributed buoyancy section may be between 10 m and 50 m, or between 10 m and 20 m, or between 20 m and 40 m, or aptly around 15 m, for example.

The distance between the first distributed buoyancy section and the second distributed buoyancy section may be between 10 m and 250 m, or between 100 m and 140 m, or between 1 m and 5 m, or 2 m, or aptly around 120 m, for example.

The relative positions along the pipe from an upper end of the riser of an upper end of each buoyancy section may be selected depending on various factors including overall sea depth and the weight of the riser, for example. The position of the mid-line buoyancy section may be fixed between 70 m and 1800 m from the upper end of the riser. Aptly, the position of the mid-line buoyancy section may be fixed between 100 m and 800 m from the upper end. The position of the first distributed buoyancy section may be fixed between 60 m and 1020 m from the upper end. Aptly, the position of the first distributed buoyancy section may be fixed between 100 m and 300 m from the upper end. The position of the second distributed buoyancy section may be fixed between 50 m and 1000 m from the upper end. Aptly, the position of the second distributed buoyancy section may be fixed between 80 m and 200 m from the upper end.

The depth of each section below the surface of the sea may also be selected depending on various factors including overall sea depth and the weight of the riser, for example. The depth of the mid-line buoyancy section 510 below the surface of the sea may be between 50 m and 1500 m. The depth of the first distributed buoyancy section 520 below the surface of the sea may be between 40 m and 1480 m. The depth of the second distributed buoyancy section 530 below the surface of the sea may be between 30 m and 1450 m. It will be appreciated that each buoyancy section will span several meters of the riser and therefore different portions of each section will lie at different depths in the sea.

Similarly, the distances between individual buoyancy compensating elements in each of the buoyancy sections may be selected depending on the specific design criteria of a particular riser. For example, the distance between individual buoyancy compensating elements in the mid-line buoyancy section may be up to 4 m. Aptly, the distance between individual buoyancy compensating elements in the mid-line buoyancy section may be 2 m. The distance between individual buoyancy compensating elements in the first distributed buoyancy section may be up to 6 m. Aptly, the distance between individual buoyancy compensating elements in the mid-line buoyancy section may be 2 m. The distance between individual buoyancy compensating elements in the second distributed buoyancy section may be between 2 m and 15 m. Aptly, the distance between individual buoyancy compensating elements in the mid-line buoyancy section may be 5 m.

It can be envisaged that different sizes of buoyancy compensating elements can be combined at varying distances apart (in a simple or complex design) to create a riser formation having the advantages described below.

With the above-described arrangement, the mid-line buoyancy section 510 supports the weight of the lower section of the riser below the mid-line buoyancy section 510 in an in-line configuration that is relatively easy to assembly without causing crushing loads to the pipe.

The first distributed buoyancy section maintains an appropriate amount of tension load on the riser in the region above the mid-line buoyancy section, and helps minimize or eliminate compression of the riser between the mid-line buoyancy section 510 and the first distributed buoyancy section 520. This is because the first distributed buoyancy section maintains the riser in a relatively straight configuration using the tension load. As such, there is no over bending of the riser at the pipe emerges from the end of the in-line buoyancy elements of the mid-line buoyancy section 510.

The second distributed buoyancy section 530 is provided in a wave configuration to decouple the movements of the vessel from any movement of the pipe.

As such, the three sections of buoyancy work together to provide a synergistic effect, by providing an arrangement in which a riser can be supported having all the advantages of an in-line buoyancy configuration as well as the advantages of a wave configuration, with a smooth transition from the straight to waved formation. The riser is supported in a suitable formation to prevent or minimize over bending. In addition, tension loads on the riser are kept within allowable tolerances, and tension loads at the hang off position (where the riser is connected to a floating facility) are reduced.

Also, with the above described arrangements the risk of the riser section between the first distributed buoyancy section and second distributed buoyancy section being over compressed or over bent is greatly reduced.

With the above described arrangements, the riser as a whole experiences minimal or even no compression forces. Also the minimum bend radius experienced by the riser is larger compared to previously known riser configurations, and therefore bending stresses on the riser are reduced.

Also the design considerations for the mid-water buoyancy 510 are made simpler as assessment and design for more severe bending loads and incorporation of bell-mouth elements may not be necessary.

With the above described arrangements the maximum effective tension on the riser is in the riser section between the mid-line buoyancy section and the first distributed buoyancy section, rather than at the hang-off position as in known riser systems. This significantly improves fatigue life performance of the riser because of reduced tension loads in the riser and particularly at the hang-off position.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A riser assembly for transporting fluids from a sub-sea location, comprising:

a riser comprising at least one segment of flexible pipe;

a plurality of buoyancy compensating elements connected to the riser and connected together in an in-line configuration to form a mid-line buoyancy section, such that each of the plurality of buoyancy compensating elements are connected in sequence to an adjacent buoyancy compensating element, wherein each of the buoyancy compensating elements are positively buoyant;

a plurality of positively buoyant buoyancy aids connected to the riser at a position above and spaced apart from the mid-line buoyancy section, the plurality of buoyancy aids forming a first distributed buoyancy section and being sufficiently positively buoyant to maintain a tension load on the riser between the first distributed buoyancy section and the mid-line line buoyancy section; and a plurality of further buoyancy compensating elements connected to the riser at a position above and spaced apart from the first distributed buoyancy section to form a second distributed buoyancy section, the second distributed buoyancy section configured to support a portion of the riser in a wave configuration, wherein the tension load on the riser between the mid-line buoyancy section and the first distributed buoyancy section is between 50 and 3550 kN.

2. A riser assembly as claimed in claim 1 wherein, in use the first distributed buoyancy section is provided at an angle of up to 25° from the central longitudinal axis of the mid-line buoyancy section.

3. A riser assembly as claimed in claim 1 wherein, in use the first distributed buoyancy section is provided at an angle of between 0° and 10° from the central longitudinal axis of the mid-line buoyancy section.

4. A riser assembly as claimed in claim 1 wherein the distance between the mid-line buoyancy section and the first distributed buoyancy section is between 10 m and 50 m.

5. A riser assembly as claimed in claim 1 wherein the distance between the mid-line buoyancy section and the first distributed buoyancy section is at least 20 m.

6. A riser assembly as claimed in claim 1 wherein the distance between the first distributed buoyancy section and the second distributed buoyancy section is between 10 m and 250 m.

7. A riser assembly as claimed in claim 1 wherein the distance between the first distributed buoyancy section and the second distributed buoyancy section is between 100 m and 140 m.

8. A riser assembly as claimed in claim 1 wherein the mid-line buoyancy section is provided at a distance of between 70 m and 1800 m from an upper end of the riser.

9. A riser assembly as claimed in claim 1 wherein the first distributed buoyancy section is provided at a distance of between 60 m and 1020 m from an upper end of the riser.

10. A riser assembly as claimed in claim 1 wherein the second distributed buoyancy section is provided at a distance of between 50 m and 1000 m from an upper end of the riser.

11. A riser assembly as claimed in claim 1 wherein the first distributed buoyancy section comprises the at least one buoyancy aid connected directly to the riser.

12. A riser assembly as claimed in claim 1 wherein the first distributed buoyancy section comprises the at least one buoyancy aid connected to the riser indirectly via one or more tethering element.

13. A method of forming a riser assembly for transporting fluids from a sub-sea location, the method comprising:

providing a riser comprising at least one segment of flexible pipe;

connecting a plurality of buoyancy compensating elements to the riser and connecting the buoyancy compensating elements together in an in-line configuration to form a mid-line buoyancy section, such that each of the plurality of buoyancy compensating elements are connected in sequence to an adjacent buoyancy compensating element, wherein each of the buoyancy compensating elements are positively buoyant;

connecting a plurality of positively buoyant buoyancy aids to the riser at a position above and spaced apart from the mid-line buoyancy section, the plurality of buoyancy aids forming a first distributed buoyancy section and being sufficiently positively buoyant to maintain a tension load on the riser between the first distributed buoyancy section and the mid-line line buoyancy section; and connecting a plurality of further buoyancy compensating elements to the riser at a position above and spaced apart from the first distributed buoyancy section to form a second distributed buoyancy section, the second distributed buoyancy section configured to support a portion of the riser in a wave configuration, wherein the tension load on the riser between the mid-line buoyancy section and the first distributed buoyancy section is between 50 and 3550 kN.

14. A method of forming a riser assembly as claimed in claim 13 wherein, in use the first distributed buoyancy section is provided at an angle of up to 25° from the central longitudinal axis of the mid-line buoyancy section.

15. A method of forming a riser assembly as claimed in claim 13 wherein, in use the first distributed buoyancy section is provided at an angle of between 0° and 10° from the central longitudinal axis of the mid-line buoyancy section.

16. A method of forming a riser assembly as claimed in claim 13 wherein the distance between the mid-line buoyancy section and the first distributed buoyancy section is between 10 m and 50 m.

17. A method of forming a riser assembly as claimed in claim 13 wherein the distance between the mid-line buoyancy section and the first distributed buoyancy section is at least 20 m.

* * * * *